US008159778B2

(12) United States Patent
Gao et al.

(10) Patent No.: US 8,159,778 B2
(45) Date of Patent: Apr. 17, 2012

(54) HARD DISK DRIVE CONTAMINATION CONTROL

(75) Inventors: Feng Gao, Singapore (SG); Yufei Han, Singapore (SG); Hongyan Jiang, Singapore (SG); Shaoyong Liu, Singapore (SG)

(73) Assignee: Hitachi Global Storage Technologies, Netherlands B.V., Amsterdam (NL)

( * ) Notice: Subject to any disclaimer, the term of this patent is extended or adjusted under 35 U.S.C. 154(b) by 394 days.

(21) Appl. No.: 12/419,221

(22) Filed: Apr. 6, 2009

(65) Prior Publication Data
US 2010/0254040 A1 Oct. 7, 2010

(51) Int. Cl.
*G11B 33/14* (2006.01)
(52) U.S. Cl. ..................... 360/97.02; 360/903
(58) Field of Classification Search ............ 360/97.02, 360/903
See application file for complete search history.

(56) References Cited

U.S. PATENT DOCUMENTS

| | | | |
|---|---|---|---|
| 5,075,807 A | 12/1991 | Inoue et al. | |
| 5,108,725 A | 4/1992 | Beck et al. | |
| 5,500,038 A | 3/1996 | Dauber et al. | |
| 5,515,214 A | 5/1996 | Kiyonaga et al. | |
| 5,876,487 A | 3/1999 | Dahlgren et al. | |
| 5,907,454 A | 5/1999 | Ahn | |
| 5,909,337 A | 6/1999 | Tyndall, III | |
| 6,000,121 A | 12/1999 | Kuroki et al. | |
| 6,559,070 B1* | 5/2003 | Mandal | 438/781 |
| 7,336,439 B2 | 2/2008 | Shin | |
| 2003/0047078 A1 | 3/2003 | Ueki et al. | |
| 2004/0168575 A1 | 9/2004 | Isogawa et al. | |
| 2011/0130478 A1* | 6/2011 | Warren et al. | 521/153 |

FOREIGN PATENT DOCUMENTS

| | | |
|---|---|---|
| JP | 03-269889 | 12/1991 |
| JP | 2001-273708 | 10/2001 |
| JP | 2002-117647 | 4/2002 |
| WO | WO-01/14041 | 3/2001 |
| WO | WO-2006/053046 | 5/2006 |

OTHER PUBLICATIONS

Mark S, et al., "Effect of Vapor Phase Chemicals on Head-Disk Interface Tribology", *Tribology Transactions*, (Apr. 1999),1-18.
Akamatsu, et al., "Study of the Adsorption of Siloxane and Hydrocarbon Contaminants onto the Surfaces at the Head/Disk Interface of a Hard Disk Drie by Thermal Desorption Spectroscopy", *Tribology Letters*, vol. 13, No. 1, (Jul. 2002), 15-20.
Wang, et al., "Enhanced Reliability of Hard Disk Drive by Vapor Corrosion Inhibitor", *IEEE International Conference on Magnetics*, (May 8, 2006),414-414.
Garrison, Marvin C., et al., "Affects of Adsorbed Films on Galvanic Corrosion in Metallic Thin Film Media", *IEEE Transactions on Magnetics*, vol. 19, No. 5, (Sep. 1983), 1683-1685.

(Continued)

*Primary Examiner* — Ly D Pham

(57) ABSTRACT

A method and system of controlling contamination within an HDD with a surface modified MCM 41/48 material. The method includes encasing the hard disk drive and a mesoporous material in an enclosure of the hard disk drive, wherein the mesoporous material sorbs contaminants within said enclosure.

17 Claims, 3 Drawing Sheets

OTHER PUBLICATIONS

Broitman, Dr. Esteban "Water Adsorption From Humid Environments Onto HDD Media Surfaces", *The Data Storage Systems Center*, (Mar. 28, 2006),1-16.

Pan, et al., "Effect of Dehydroxylation on the Adsorptive and Catalytic Properties of Cr/M41S", *Department of Chemical and Environmental Engineering National University of Singapore*, Singapore 119260, (1999),509-514.

Pan, et al., "Preparation, Characterization and Adorption Properties of Hydrophobically Modified MCM48 Supported Metal Adsorbent", *Journal of The Institution of Engineers*, Singapore, vol. 38, No. 3, (1998),55-57.

Xu, et al., "A Novel Epoxy Encapsulant for CSP", *2000 International Symposium on Advanced Packaging Materials*, (2000),83-89.

* cited by examiner

200

> Encase the hard disk drive and a mesoporous material in an enclosure of the hard disk drive, wherein said mesoporous material sorbs contaminants within the enclosure
> 210

Surface modify MCM 41/48 that is initially hydrophilic in nature to hydrophobic in nature, wherein the surface is modified by Me3SiCl
310

Encase the hard disk drive and the surface modified MCM 41/48 in an enclosure, wherein said surface modified MCM 41/48 adsorbs siloxanes within the enclosure to prevent hard disk drive failure
320

HARD DISK DRIVE CONTAMINATION CONTROL

FIELD

Embodiments of the present technology relates generally to the field of data storage.

BACKGROUND

Contaminants within a hard disk drive (HDD) can cause the HDD to fail. For example, contaminants such as, but not limited to hydrocarbons can affect the writing and/or reading of data. Activated carbon and desiccants have been commonly used in an HDD to sorb contaminants such as hydrocarbons and moisture.

BRIEF DESCRIPTION OF THE DRAWINGS

FIG. 2 illustrates an example of a flow chart of a method for controlling contamination within an HDD, in accordance with an embodiment of the present invention.

The drawings referred to in this description should be understood as not being drawn to scale except if specifically noted.

DESCRIPTION OF EMBODIMENTS

Reference will now be made in detail to embodiments of the present technology, examples of which are illustrated in the accompanying drawings. While the technology will be described in conjunction with various embodiment(s), it will be understood that they are not intended to limit the present technology to these embodiments. On the contrary, the present technology is intended to cover alternatives, modifications and equivalents, which may be included within the spirit and scope of the various embodiments as defined by the appended claims.

Furthermore, in the following description of embodiments, numerous specific details are set forth in order to provide a thorough understanding of the present technology. However, the present technology may be practiced without these specific details. In other instances, well known methods, procedures, components, and circuits have not been described in detail as not to unnecessarily obscure aspects of the present embodiments.

An HDD can contain contaminants that can cause the HDD to fail. Contaminants can enter into the HDD during manufacturing or the contaminants can be from the component materials within the HDD. Generally, activated carbon is used in the HDD to adsorb contaminants such as but not limited to hydrocarbons and siloxanes. Also, a desiccant is generally used to absorb contaminants, such as but not limited to moisture, within the HDD.

Technology and consumer demand forces the HDD to become smaller and smaller. As the size of the components within the HDD become smaller and the spacing between the components becomes smaller, contaminants that were once sorbed to an innocuous level within the HDD are now causing HDD failure.

For example, organic outgassing of hydrocarbons, such as siloxanes can cause drive failures in an HDD with a very low fly-height. Hydrocarbons such as siloxanes can be found in most components of an HDD and even in cleanroom environments of the HDD assembly. The siloxanes can become affixed to the disk and/or head surface and affect the transfer of data from and/or onto the disk and cause HDD failure. Current filters such as activated carbons and desiccants are at their sorbent capacities to effectively sorb the aforementioned contaminants to an innocuous level for HDD's with a low fly height.

Figure 1:
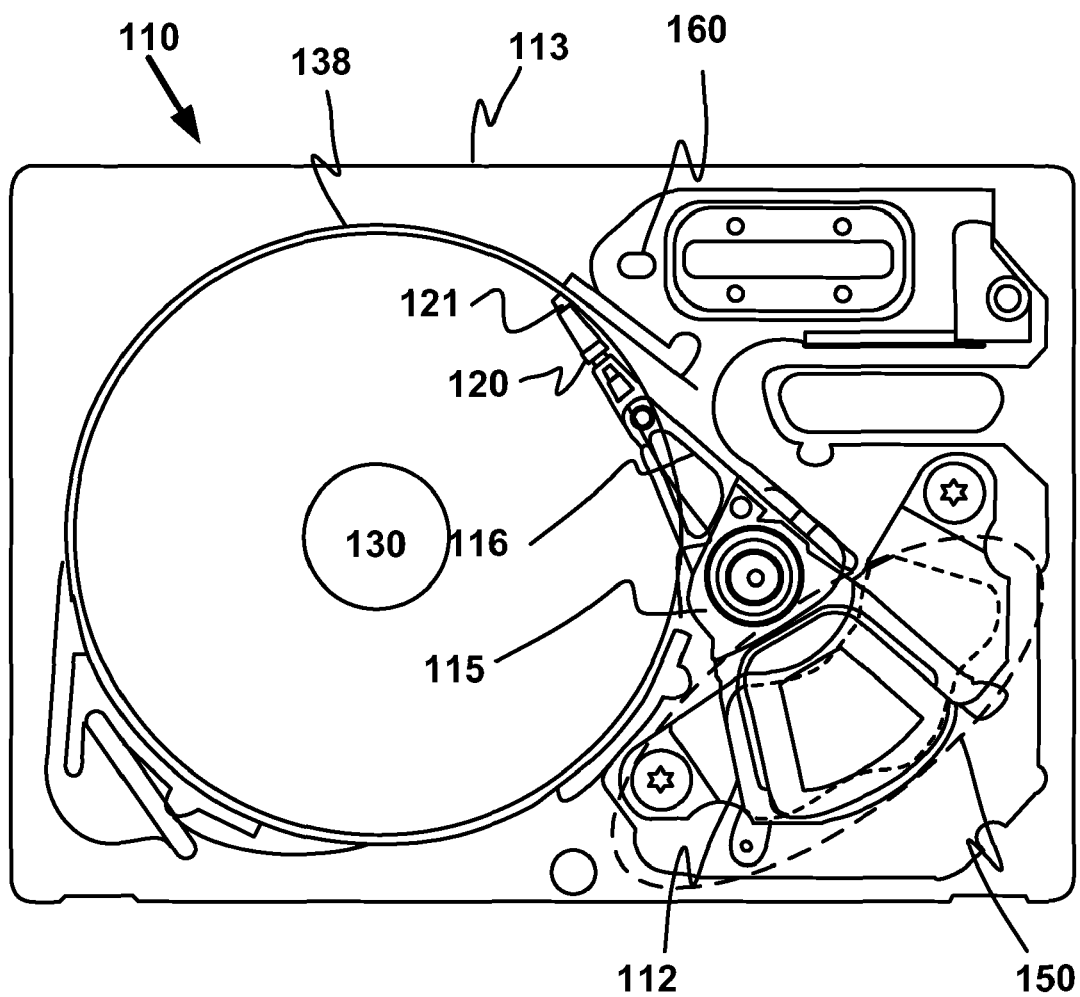
FIG. 1 illustrates an example of an HDD, in accordance with an embodiment of the present invention.

With reference now to FIG. 1, a schematic drawing of one embodiment of an information storage system including a magnetic hard disk file or HDD 110 for a computer system is shown, although only one head and one disk surface combination are shown. What is described herein for one head-disk combination is also applicable to multiple head-disk combinations. In other words, the present technology is independent of the number of head-disk combinations.

In general, HDD 110 has an outer sealed housing 113 usually including a base portion (shown) and a top or cover (not shown). The sealed housing 113 can also be referred to as enclosure. In one embodiment, housing 113 contains a disk pack having at least one media or magnetic disk 138. The disk pack (as represented by disk 138) defines an axis of rotation and a radial direction relative to the axis in which the disk pack is rotatable.

A spindle motor assembly having a central drive hub 130 operates as the axis and rotates the disk 138 or disks of the disk pack in the radial direction relative to housing 113. An actuator assembly 115 includes one or more actuator arms 116. When a number of actuator arms 116 are present, they are usually represented in the form of a comb that is movably or pivotally mounted to base/housing 113. A controller 150 is also mounted to base 113 for selectively moving the actuator arms 116 relative to the disk 138. Actuator assembly 115 may be coupled with a connector assembly, such as a flex cable to convey data between arm electronics and a host system, such as a computer, wherein the HDD 110 resides.

In one embodiment, each actuator arm 116 has extending from it at least one cantilevered integrated lead suspension (ILS) 120. The ILS 120 may be any form of lead suspension that can be used in a data access storage device. The level of integration containing the slider 121, ILS 120, and read/write head is called the Head Gimbal Assembly (HGA).

The ILS 120 has a spring-like quality, which biases or presses the air-bearing surface of slider 121 against disk 138 to cause slider 121 to fly at a precise distance from disk 138. The distance between the slider 121 and the disk 138 is the fly height. ILS 120 has a hinge area that provides for the spring-like quality, and a flexing cable-type interconnect that supports read and write traces and electrical connections through the hinge area. A voice coil 112, free to move within a conventional voice coil motor magnet assembly is also mounted to actuator arms 116 opposite the head gimbal assemblies. Movement of the actuator assembly 115 by controller 150 causes the head gimbal assembly to move along radial arcs across tracks on the surface of disk 138.

In one embodiment, the HDD 110 has a contamination control 160. The contamination control 160 will be described in detail below. The location of contamination control within the HDD is not limited to the location depicted in FIG. 1. Contamination control 160 can be located anywhere within the enclosure of the HDD so that it effectively sorbs contaminants within the enclosure of the HDD. It can be appreciated that the contamination control 160 can be distributed or integrated.

In one embodiment, the contamination control 160 is a mesoporous material that sorbs contaminants within the enclosure. A mesoporous material generally has a pore size in the range of 35 to 50 Å. Mesoporous materials also have a very uniform pore size.

In another embodiment, the mesoporous material is a mesoporous silicate that is initially hydrophilic and is surface modified to be hydrophobic, such that the surface modified mesoporous material adsorbs contaminants within the HDD enclosure. The mesoporous silicate can be Mobil Catalytic Material (MCM), such as but not limited to MCM-41, MCM-48 or any MCM in the MCM 41/48 material family. MCM 41/48 material is generally hydrophilic in nature. However, MCM 41/48 can be modified to be hydrophobic by surface modification using chlorosilanes, such as but not limited to Me3SiCl. The surface modified MCM 41/48 has unique properties that make it ideal to be a more effective adsorbent to further reduce the levels hydrocarbons such as siloxanes within an HDD that has a very low fly height.

In general, an HDD becomes more sensitive to siloxanes having a fly height below 10 nanometers. An HDD with an activated carbon sorbent generally experiences no failures due to siloxanes with a fly height larger than 10 nanometers. However, an HDD with an activated carbon sorbent can experience failures due to siloxanes with a fly height at or below 10 nanometers. In one embodiment, the HDD fly height is in the range of about 3-4 nanometers. In another embodiment, the fly height is in the range of about 7-8 nanometers.

Initially, MCM 41/48 has numerous hydroxyl groups on its surface that make MCM 41/48 hydrophilic in nature. It can be appreciated that the hydroxyl group is at least an oxygen (O) atom connected to a hydrogen (H) atom. It can be appreciated that the hydroxyl groups can be a combination of oxygen atom and hydrogen atom. The hydroxyl groups tend to absorb more moisture due to hydrogen bonding and consequently MCM 41/48 is less adsorptive of hydrocarbons and siloxanes. In particular, the MCM 41/48 surface is modified by $Me_3SiCl$, so that MCM 41/48 is hydrophobic in nature and is more adsorptive of hydrocarbons and siloxanes. The chlorite interacts with the H on the surface of the MCM, which in turn gives hydrogen chloride (HCl), and the $Me_3Si$ attaches to the surface of the MCM. The $Me_3Si$ group on the surface of the MCM modifies the MCM to become more hydrophobic.

In one embodiment, the contamination control 160 is MCM that is partially surface modified, wherein the partially modified surface is hydrophobic and the surface that is not surface modified remains hydrophilic. For example, a part of the MCM surface is modified, as described above. The part of the MCM surface that is modified, is hydrophobic and is effective in adsorbing hydrocarbons and siloxanes. The unmodified MCM surface still remains hydrophilic and is effective in absorbing moisture within the HDD. In another embodiment, the contamination control 160 is MCM 41/48 that is fully surface modified and hydrophobic in nature, as described above, and is combined with MCM 41/48 that is not modified and hydrophilic in nature. In another embodiment, the ratios between the modified and unmodified MCM 41/48 can be varied to accommodate the lowering of different contaminants within the HDD.

Additionally, MCM 41/48 has very good catalysis support. The uniform pore size and high surface area, as described above, is ideal for a catalytic reaction. Also, the very high specific surface area allows for smaller volume of a contamination control compared to activated carbon, which has a smaller specific surface area compared to MCM 41/48. MCM 41/48 has a specific surface area of about 1000 meters$^2$ per gram ($m^2/g$) before and after surface modification.

FIG. 2 depicts a method 200 of manufacturing a hard disk drive with contamination control. In step 210 of method 200, the hard disk drive and a mesoporous material are encased in an enclosure, wherein the mesoporous material sorbs contaminants within said enclosure.

In one embodiment of method 200, the surface of the mesoporous material that is hydrophilic in nature is modified to be hydrophobic in nature, such that the surface modified mesoporous material adsorbs contaminants within the enclosure. In another embodiment, the mesoporous material is MCM-41, MCM-48 or any MCM in the MCM 41/48 material family. In a further embodiment, the MCM 41/48 is modified by $Me_3SiCl$.

In one embodiment, the contaminants are sorbed by combining an unmodified mesoporous material that is substantially hydrophilic in nature with the modified mesoporous material and disposing the combination in the enclosure, such that the unmodified mesoporous material absorbs contaminants in the enclosure and the modified mesoporous material adsorbs contaminants in the enclosure. In another embodiment, the contaminants are sorbed by modifying a portion of a surface of the mesoporous material, wherein the modified portion adsorbs contaminants in the enclosure and an unmodified portion of a surface of the mesoporous material absorbs contaminants within the enclosure.

In one embodiment of method 200, the mesoporous material has a substantially uniform pore size across. In another embodiment, the mesoporous material has a specific surface area of at least 1000 $m^2/g$.

Figure 3:
FIG. 3 illustrates an example of a flow chart of a method for controlling contamination within an HDD, in accordance with an embodiment of the present invention.

FIG. 3 depicts a method 300 for enabling low fly height in a hard disk drive. Step 310 of the method is the surface of MCM 41/48 that is initially hydrophilic in nature modified to be hydrophobic in nature, wherein the surface is modified by $Me_3SiCl$. Step 320 is the hard disk drive and the surface modified MCM 41/48 encased in an enclosure, wherein the surface modified MCM 41/48 adsorbs siloxanes within the enclosure to prevent hard disk drive failure.

Although the subject matter has been described in a language specific to structural features and/or methodological acts, it is to be understood that the subject matter defined in the appended claims is not necessarily limited to the specific features or acts described above. Rather, the specific features and acts described above are disclosed as example forms of implementing the claims

What is claimed is:

1. Hard disk drive comprising hard disk drive contamination control, said disk device comprising:
   an enclosure of said hard disk drive; and
   a mesoporous material disposed within said enclosure, wherein said mesoporous material sorbs contaminants within said enclosure and wherein said mesoporous material has substantially uniform pore size across an outer surface of said mesoporous material.

2. The hard disk drive of claim 1, wherein said mesoporous material is a mesoporous silicate that is initially hydrophilic and is surface modified to be hydrophobic, such that said surface modified mesoporous material adsorbs contaminants within said enclosure.

3. The hard disk drive of claim 2, wherein said surface modified mesoporous material is partially surface modified, wherein said partially surface modified surface is hydrophobic and said surface that is not surface modified remains hydrophilic.

4. The hard disk drive of claim 1, wherein said mesoporous material is selected from a list consisting essentially of: MCM-41 or MCM-48.

5. The hard disk drive of claim 1, wherein said mesoporous material is surface modified by $Me_3SiCl$.

6. The hard disk drive of claim 1, wherein said hard disk drive further comprises:
   a surface modified mesoporous material that is hydrophobic combined with said mesoporous material that is hydrophilic, such that said unmodified mesoporous material absorbs and said surface modified mesoporous material adsorbs contaminants in said enclosure.

7. The hard disk drive of claim 1, wherein said mesoporous material has a specific surface area of at least 1000 $m^2/g$.

8. A method of manufacturing a hard disk drive with contamination control, said method comprising:
   encasing said hard disk drive and a mesoporous material in an enclosure of said hard disk drive, wherein said mesoporous material sorbs contaminants within said enclosure and wherein said mesoporous material has substantially uniform pore size across an outer surface of said mesoporous material.

9. The method of claim 8, wherein said method further comprises:
   surface modifying said mesoporous material that is hydrophilic in nature to hydrophobic in nature, such that said surface modified mesoporous material adsorbs contaminants within said enclosure.

10. The method of claim 9, wherein said surface modifying said mesoporous material comprises:
    modifying said mesoporous material with $Me_3SiCl$.

11. The method of claim 9, wherein said surface modifying a mesoporous material comprises:
    modifying a portion of an surface of said mesoporous material, wherein said modified portion adsorbs contaminants in said enclosure and an unmodified portion of a surface of said mesoporous material absorbs contaminants within said enclosure.

12. The method of claim 8, wherein said mesoporous material is selected from a list consisting essentially of: MCM 41/48.

13. The method of claim 8, wherein said method comprises:
    combining an unmodified mesoporous material that is substantially hydrophilic in nature with said modified mesoporous material and disposing said combination in said enclosure, such that said unmodified mesoporous material absorbs contaminants in said enclosure.

14. The method of claim 8, wherein said mesoporous material has a substantially uniform pore size across.

15. The method of claim 8, wherein said mesoporous material has a specific surface area of at least 1000 $m^2/g$.

16. A method of enabling low fly height in a hard disk drive, said method comprising:
    surface modifying MCM 41/48 that is initially hydrophilic in nature to hydrophobic in nature, wherein said surface is modified by $Me_3SiCl$; and
    encasing said hard disk drive and said surface modified MCM 41/48 in an enclosure, wherein said surface modified MCM 41/48 adsorbs siloxanes within said enclosure to prevent hard disk drive failure.

17. The method of claim 16, wherein said fly height is less than 10 nanometers.

* * * * *